May 10, 1927.

L. R. STOWE

STOKER

Filed July 7, 1922 12 Sheets-Sheet 1

1,627,715

Inventor
Loyd R. Stowe
by Sheridan, Jones, and Sheridan
Atty's.

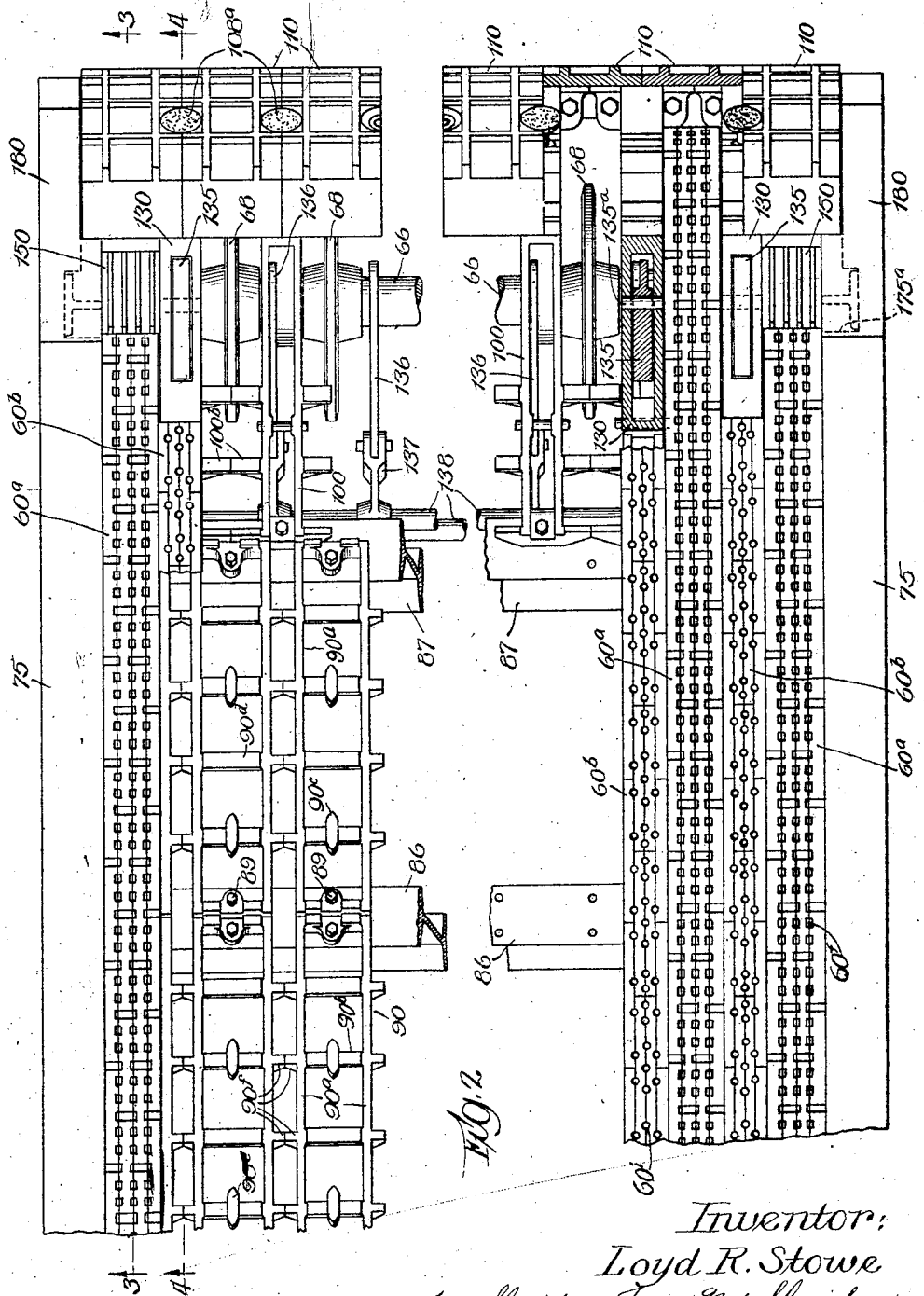

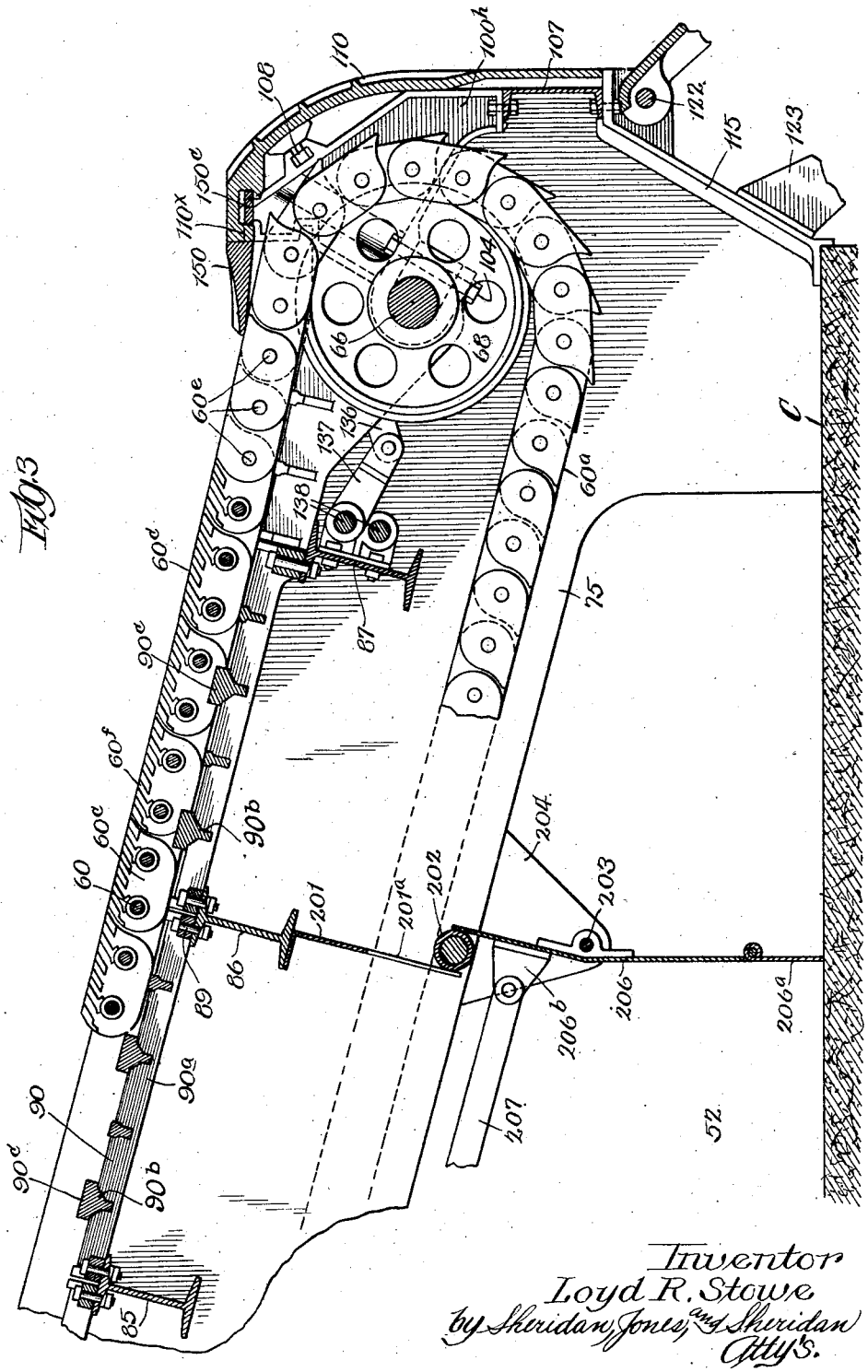

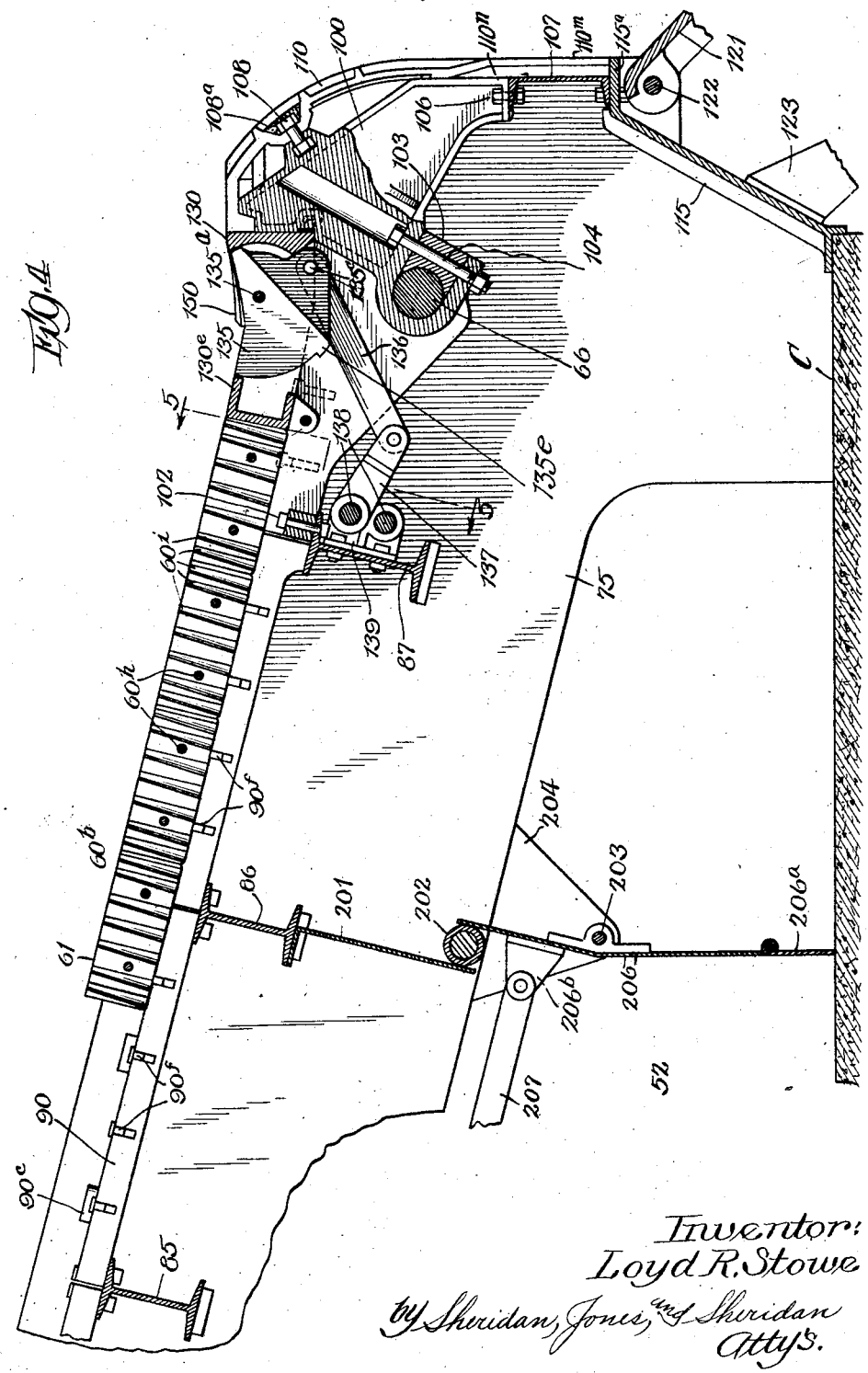

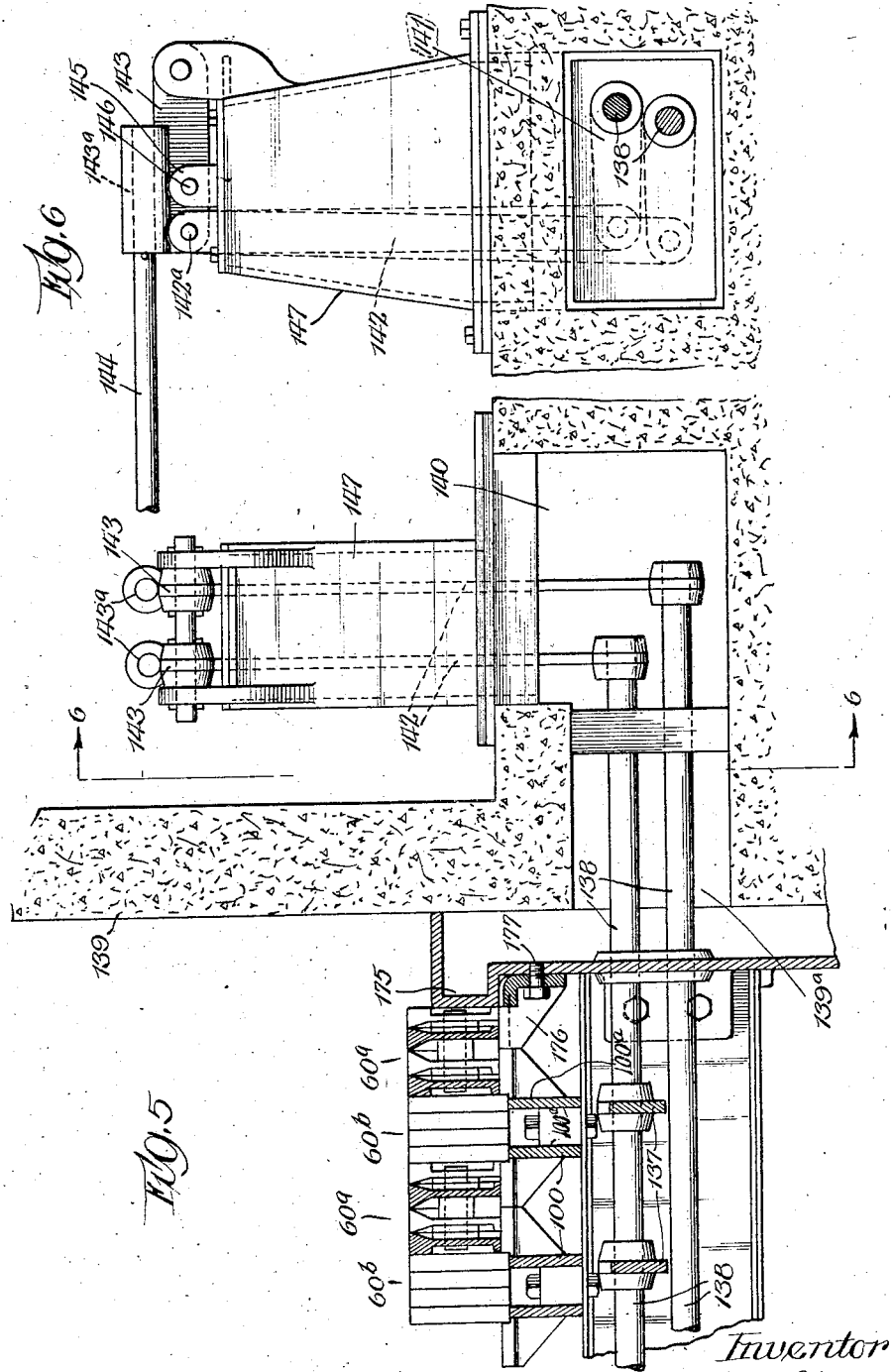

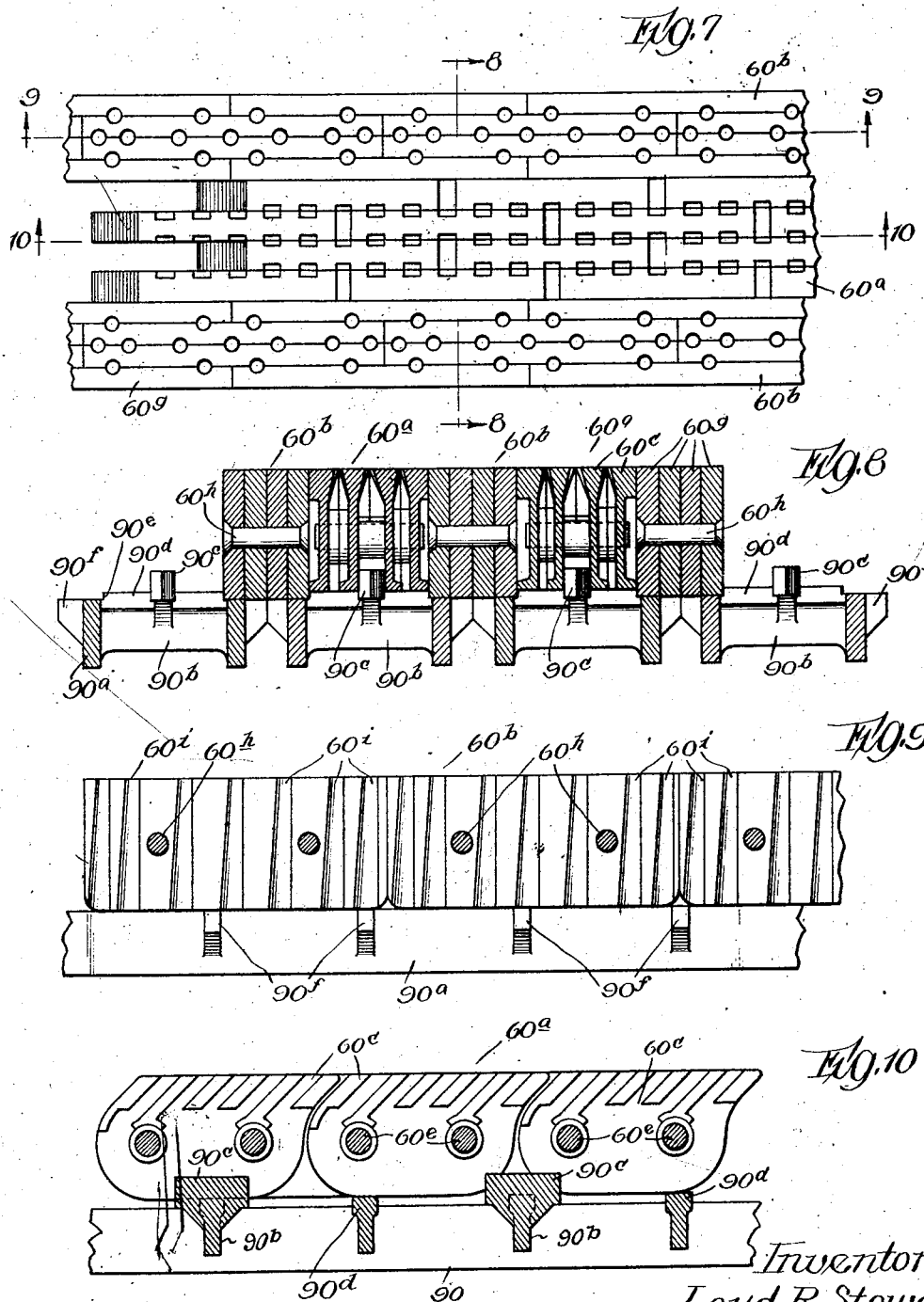

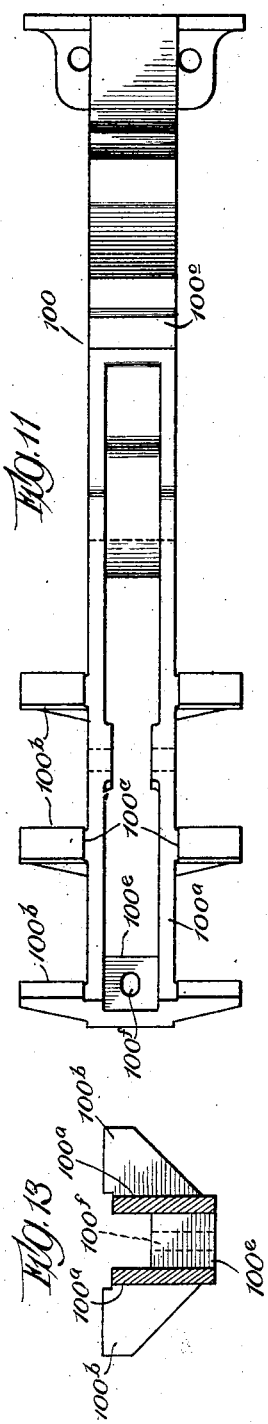
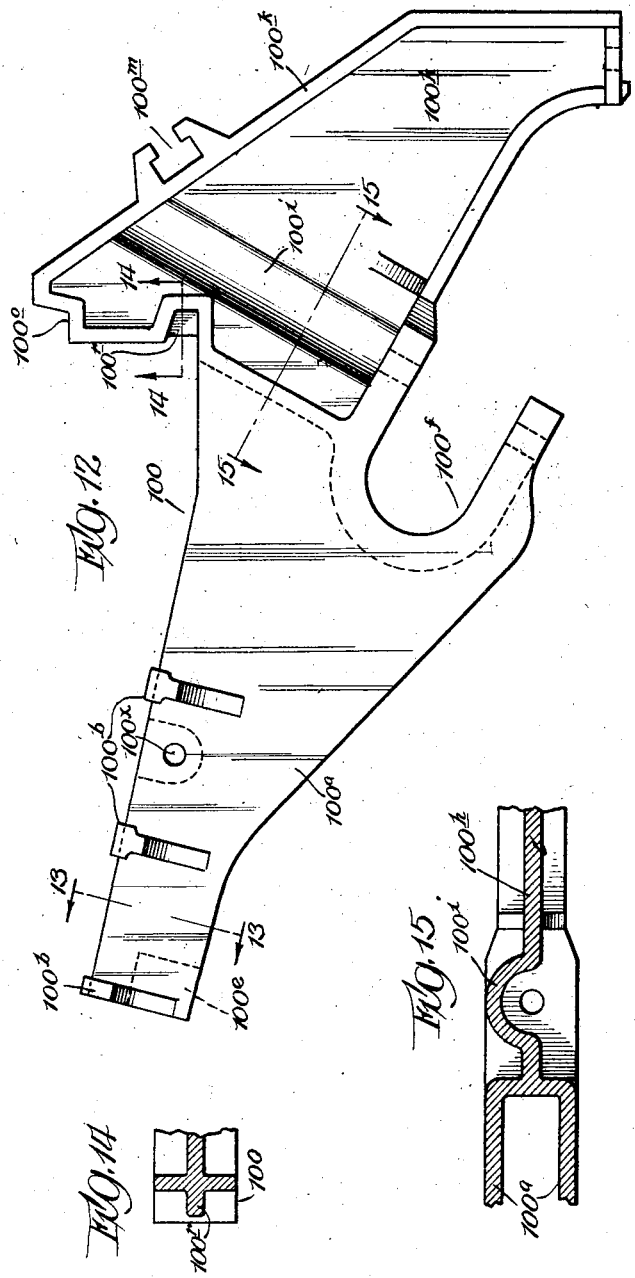

May 10, 1927.
L. R. STOWE
STOKER
Filed July 7, 1922
1,627,715
12 Sheets-Sheet 8
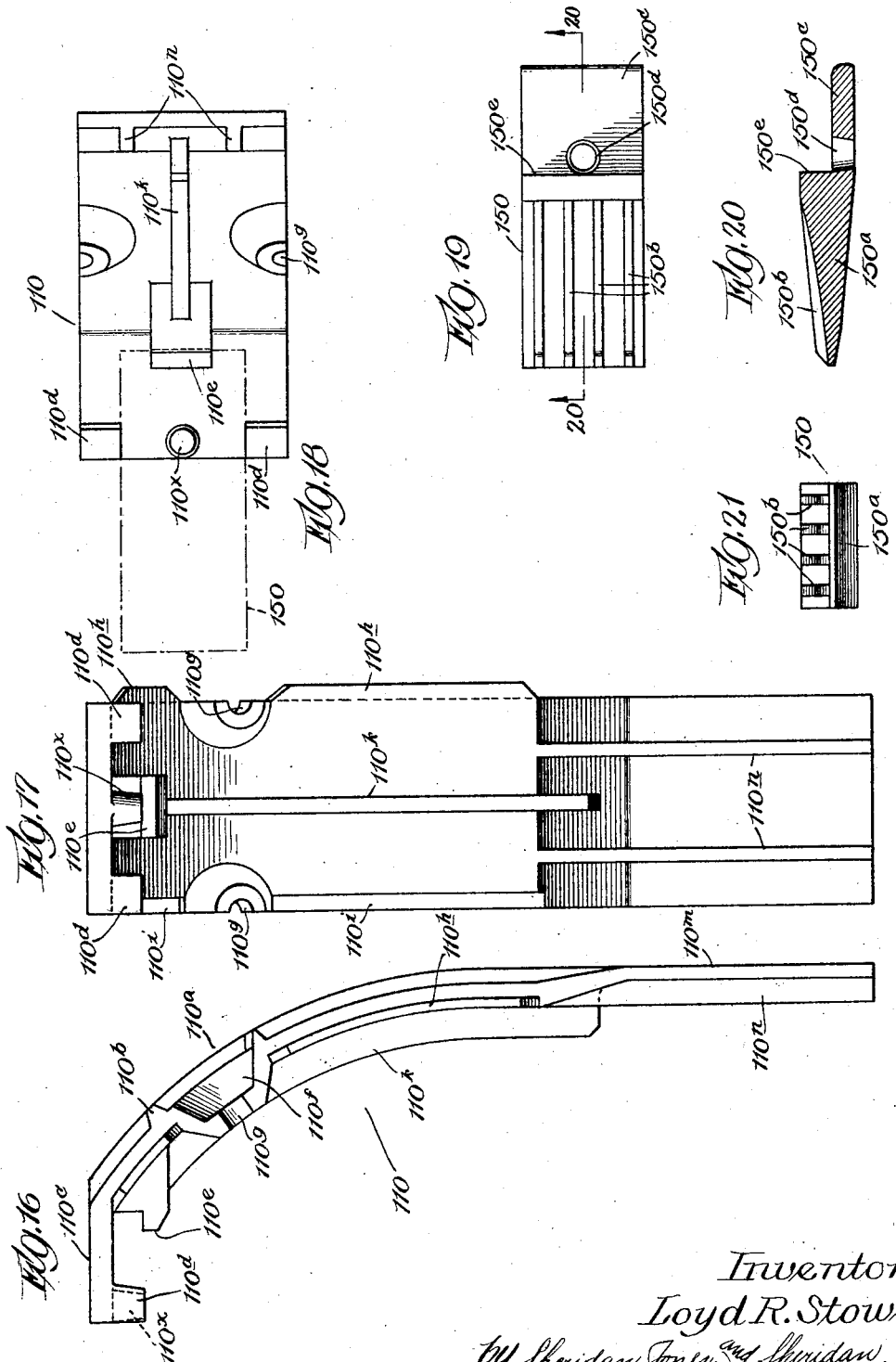
Inventor:
Loyd R. Stowe
By Sheridan, Jones and Sheridan
Atty's.

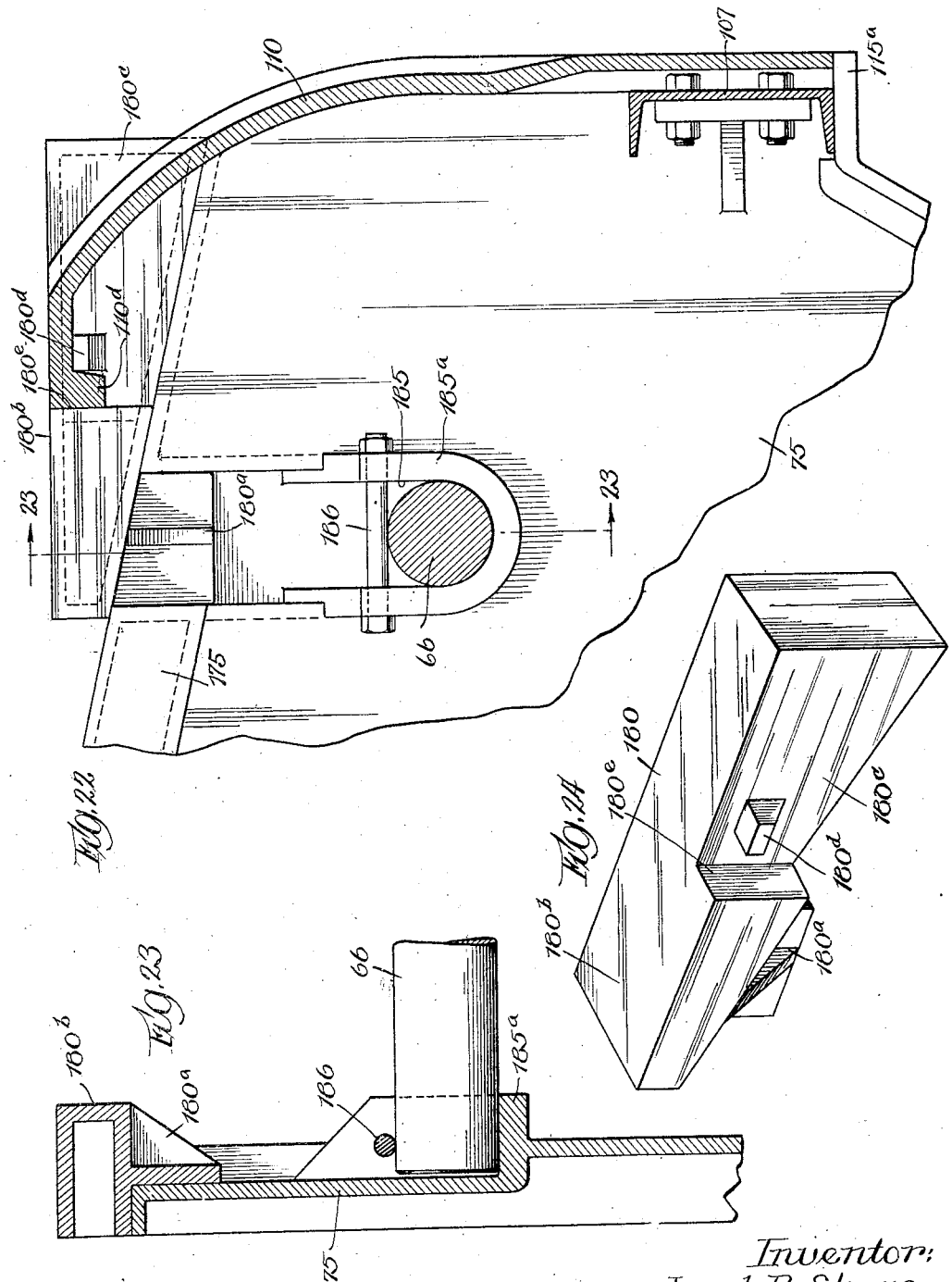

May 10, 1927.　　　　　L. R. STOWE　　　　　1,627,715
STOKER
Filed July 7, 1922　　　12 Sheets-Sheet 10
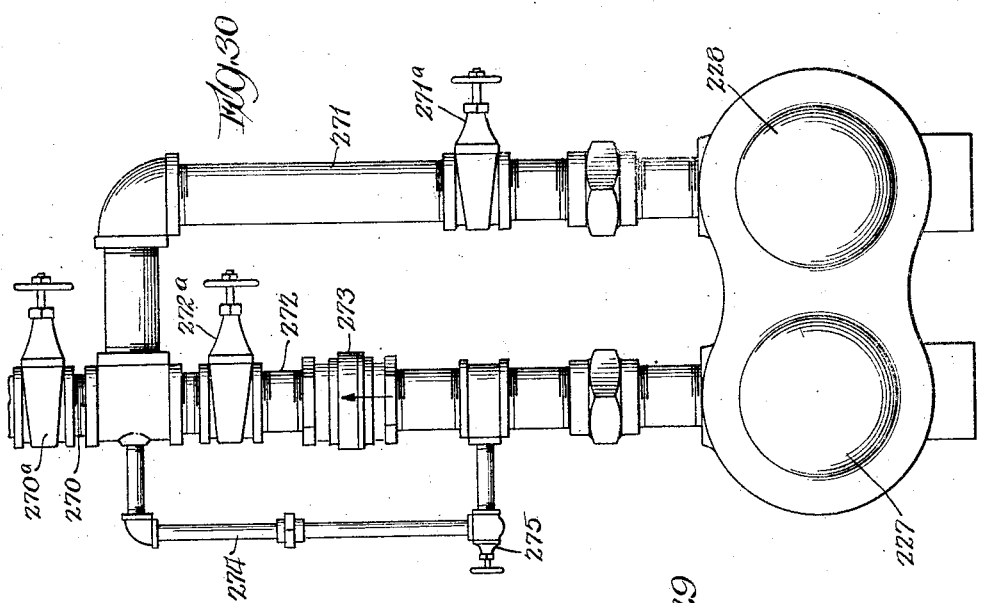
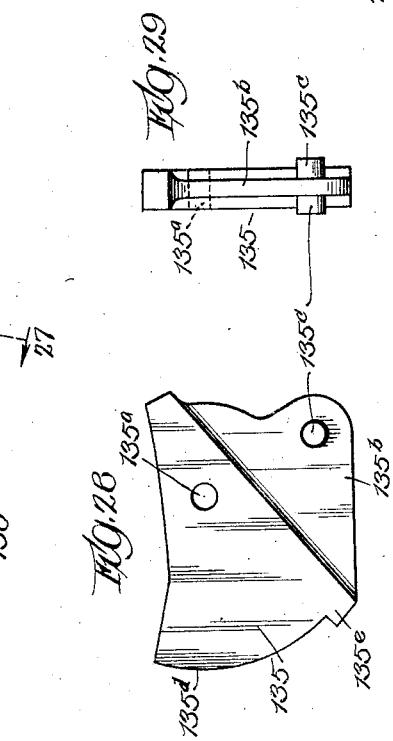
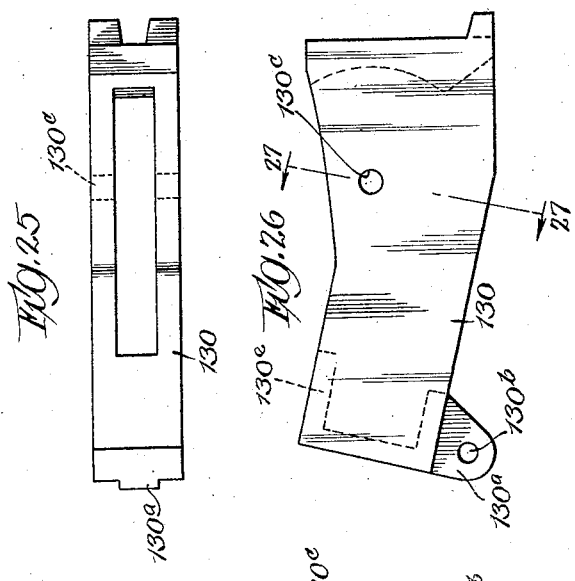
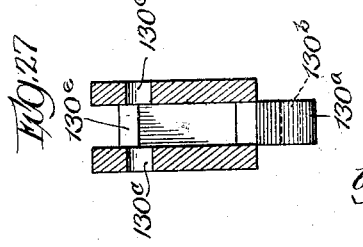
Inventor:
Loyd R. Stowe
by Sheridan, Jones, and Sheridan
Attys.

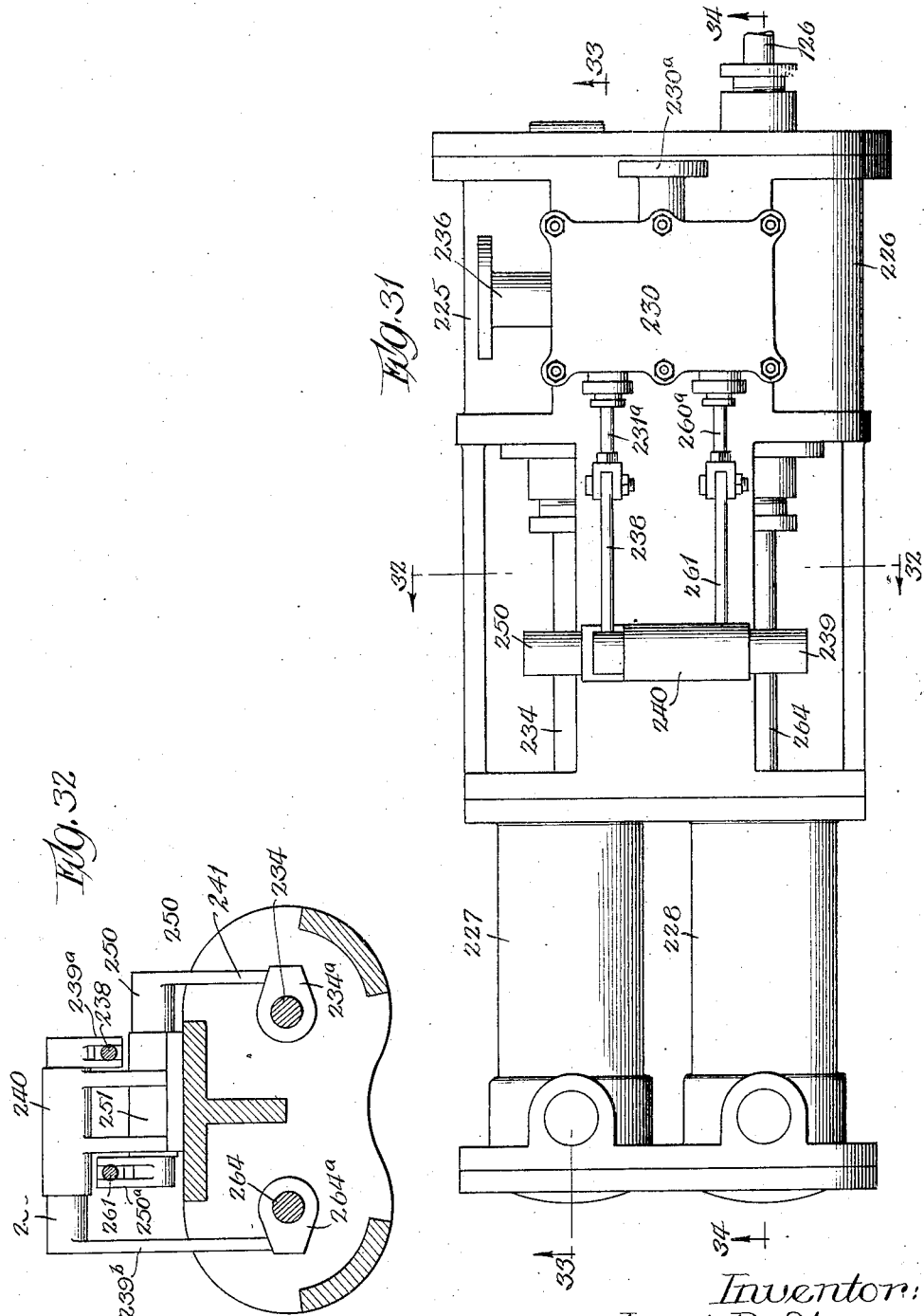

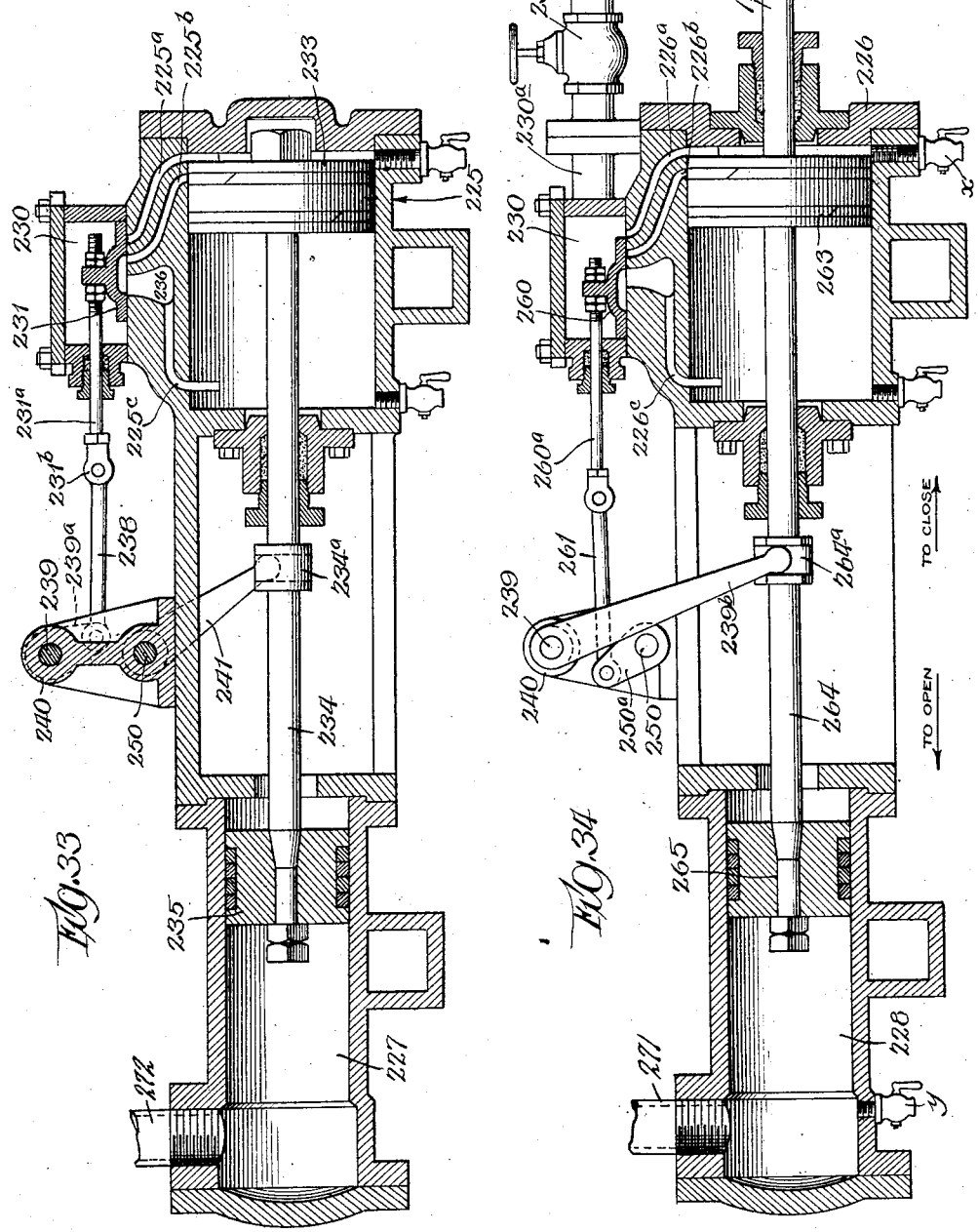

Patented May 10, 1927.

1,627,715

UNITED STATES PATENT OFFICE.

LOYD R. STOWE, OF ST. LOUIS, MISSOURI.

STOKER.

Application filed July 7, 1922. Serial No. 573,303.

This invention relates to improvements in stokers and has for its object to provide a new and improved stoker mechanism in which the coal and other fuel may be properly advanced to the combustion chamber of a furnace and the ash resulting from the combustion thereof may be removed from the stoker proper and collected in a suitable place of deposit from which it may intermittently be discharged.

Another object consists in the provision of mechanism to positively assist the discharge of ash from the grate.

Another object consists in the provision of a structure such as outlined above in which the combustion chamber will be securely sealed from the ash pit, save during short periods of time during which the collected ash is being discharged, my structure being designed to substantially prevent ingress of air to the combustion chamber save through the grate, thereby eliminating short circuiting and obtaining close control of the draught.

Another object consists in the provision of damper mechanism to control the draught adjacent the rear of the grate.

Still another object consists in the provision of new and improved actuating means for the intermittent actuation of the ash discharge.

These and other objects will be more fully set forth and described in the following specification and shown in the accompanying drawings, in which—

Fig. 2 is a plan view of the grate showing various elements thereof removed for purpose of illustration, portions of the structure being also shown as broken away and other portions in section;

Fig. 3 is a vertical longitudinal section taken along the line 3—3 of Fig. 2, some of the grate links and connecting pins being omitted for clearness and some being shown in outline only;

Fig. 4 is a section similar to Fig. 3 being taken along the line 4—4 of Fig. 2;

Fig. 5 is a transverse vertical section along the line 5—5 of Fig. 4, showing the kicker actuating means;

Fig. 6 is a section along the line 6—6 of Fig. 5;

Fig. 7 is a plan view of a portion of the grate showing one of the grate chains between adjacent tuyère bars;

Fig. 8 is a transverse section along the line 8—8 of Fig. 7;

Fig. 9 is a longitudinal section along the line 9—9 of Fig. 7;

Fig. 10 is a similar view along the line 10—10 of Fig. 7;

Fig. 11 is a plan view of one of the rear end supporting blocks;

Fig. 12 is a side elevation of the same;

Fig. 13 is a section along the line 13—13 of Fig. 12;

Fig. 14 is a section along the line 14—14 of Fig. 12;

Fig. 15 is a section along the line 15—15 of Fig. 12;

Fig. 16 is a side elevation of one of the sealing aprons;

Fig. 17 is a front elevation of the same;

Fig. 18 is a bottom plan view of the same, one of the ash diverting plow members being indicated in dotted lines;

Fig. 19 is a plan view of one of the plows;

Fig. 20 is a vertical section along the line 20—20 of Fig. 19;

Fig. 21 is a front elevation of the same;

Fig. 22 is a side elevation of the construction at the inner side of one of the side frame members, adjacent apron member and transverse channel being shown in section, together with the idler sprocket shaft;

Fig. 23 is a vertical section along the line 23—23 of Fig. 22, the sprocket shaft being shown in elevation;

Fig. 24 is a perspective of a side apron block;

Fig. 25 is a plan view of one of the kicker casings;

Fig. 26 is a side elevation of the same;

Fig. 27 is a section along the line 27—27 of Fig. 26;

Fig. 28 is a side elevation of one of the kickers;

Fig. 29 is an end elevation of the same;

Fig. 30 is an end elevation of the ash discharge actuating mechanism showing the arrangement of the water feed pipes;

Fig. 31 is a plan view of the actuating pump;

Fig. 32 is a section along the line 32—32 of Fig. 31;

Fig. 33 is a vertical section along the line 33—33 of Fig. 31; and

Fig. 34 is a similar section along the line 34—34 of Fig. 31.

Figure 1:
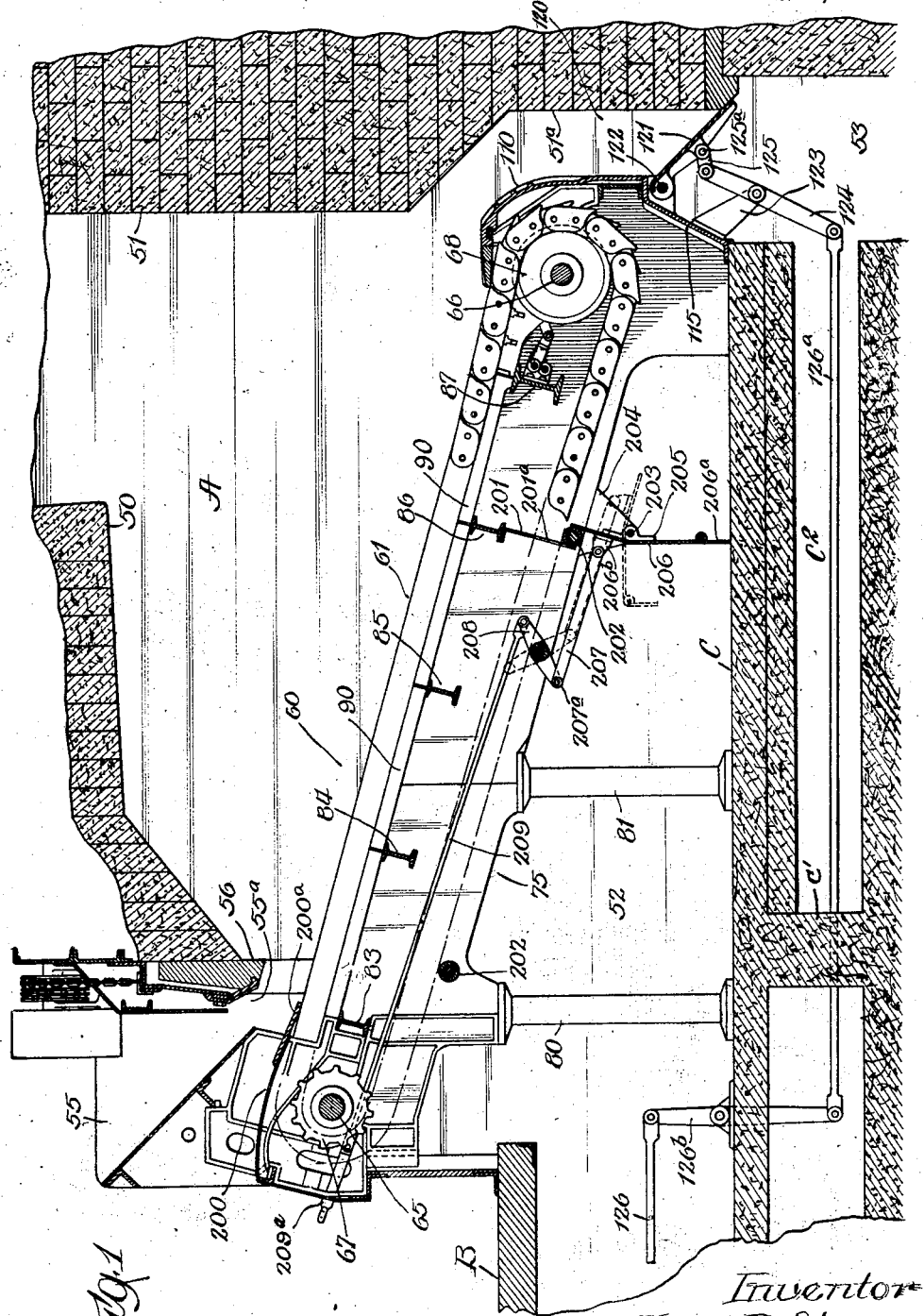
Figure 1 is a vertical longitudinal section through a furnace showing an embodiment of my invention located therein the grate being shown in outline in part and diagrammatically in part.

Like numerals refer to like elements throughout the drawings, in which 50 designates generally a fire or ignition arch, 51 the rear wall of the combustion chamber, 52 the air chamber beneath the stoker and 53 the ash discharge chute. Located at the front of the furnace is provided a feed hopper 55, having a constricted discharge passage 55$^a$ the size of which may be regulated by raising or lowering feed gate 56 by any suitable mechanism. Located in the combustion chamber A is the stoker generally indicated by numeral 60, having a downwardly inclined upper surface 61. The grate of the stoker is formed by alternate moving chain portions 60$^a$ and intermediate tuyère bars 60$^b$ which are stationary. The chains are all formed of overlapping link plates 60$^c$ connected by means of suitable pins 60$^e$ and provided with passages 60$^f$. The tuyère bars, as shown in Figs. 7 to 9, for example, are formed of a plurality of overlapping jointed plates 60$^g$, suitably joined together by bolts or pins 60$^h$, and having suitable air passages 60$^i$ therethrough.

At the ends of the stoker are provided carrying shafts 65, 66 respectively, the sprocket wheels 67 being carried upon the shaft 65 to rotate thereon and to mesh with the chains. On the shaft 66 are carried the idler wheels 68 partially surrounding which run the chains in a conventional manner. At the sides of the stoker are provided side frames, generally indicated by numeral 75, formed in sections. The sections of the side frame are secured together and supported by concrete work while the center frames, similar in construction to the side frames, are supported by floor B, pedestals 80, 81, and sub-foundation C. Extending between the side frames are the transverse supporting beams 83, 84, 85, 86 and 87, the last being larger and all of the beams being preferably of I-section for the purpose of strength. Extending between and secured to the upper flanges of the I-beams by bolts 89 or the like, are the tuyère supports 90, shown, for example, in Figs. 2, 3, 4 and 8 to 10. These tuyère supports are constructed with longitudinal sides 90$^a$ between which extend cross-ribs 90$^b$ from which project upwardly the lugs 90$^c$, preferably tapered at the ends, these lugs being provided to properly guide and aline the chains feeding between the central ribs of the chain links in the space provided for sprocket and idler wheels, see Fig. 8 for example. The tuyère supports are further provided with cross-ribs 90$^d$ upon which ride the chains, as shown for example in Figs. 8 to 10, these cross-ribs being slightly raised above the upper surface of the sides 90$^a$ to form shoulders 90$^e$, see Fig. 8. In alinement with the ribs 90$^d$ and projecting at either side of the sides 90$^a$ are the spacing lugs 90$^f$. When the structure is assembled, it will be apparent, as shown in Fig. 8, that a slightly depressed seat is provided between shoulders 90$^e$ of adjacent supports 90, in which are seated the tuyère bars 60$^b$, this construction assuring a proper assembly of the tuyère bars and preventing their accidental displacement or toppling, and also eliminating in ordinary constructions the necessity for fastening the tuyère bars to the supports. At the rear of the stoker in alinement with the tuyère bars are the supporting blocks 100 shown in Figs. 4, 11 and 12, for example, each of these blocks being provided with a forwardly extending arm 100$^a$ formed of parallel spaced plates from which extend laterally at either side, the lugs 100$^b$, having their upper surfaces slightly above the plane of the upper surfaces of the plates 100$^a$ to form shoulders 100$^c$, spaced apart a distance substantially equal to the thickness of the tuyère bars to form a continuation of the seats therefor. Between the plates 100$^a$ at the front end thereof, is a connecting boss 100$^e$, which is provided with a bolting aperture 100$^f$ through which, when in assembled position, extends the bolt 102, see Fig. 4, which bolts the block 100 to supporting beam 87. The body portion of the block 100 is slotted at 100$^f$ to fit over idler wheel shaft 66, a small block 103 being fitted into the slot and secured therein by a bolt 104, see Fig 4, thereby forming with the block 100 a supplemental support for shaft 66. The web 100$^h$ of the body of the block 100 is curved at 100$^i$ to accommodate the bolt 104, see Figs. 4, 12 and 15. Surrounding the web 100$^h$ is a flange 100$^k$, the bottom of which is enlarged and apertured for insertion of bolts 106, which secure the blocks 100 to the flange of a transverse channel 107. Located upon the upper portion of the flange 100$^k$ is the bolting channel 100$^m$ to accommodate bolt 108. A seat 100$^o$ is provided at the upper front of the flange 100$^k$ for a purpose described below. Located below the seat 100$^o$ and separated thererom by a portion of flange 100$^k$ are the seats 100$^p$ formed by a dividing web 100$^r$ see Figs. 12 and 14 for example.

Aprons generally indicated by numeral 110 are provided and located across the rear of the grate, to provide a seal between the combustion chamber and the draught chamber beneath the stoker. These aprons shown for example in Figs. 2, 4, 16, 17 and 18, are provided with a curved portion 110$^a$, having shallow pockets formed on its outer surface by means of checker ridges or ribs 110$^b$. The aprons 110 are each formed with a forwardly projecting top portion 110$^c$, having a downwardly extending positioning lug 110$^d$ at each side thereof and a downwardly extending centrally located lug 110$^x$. The lugs 110$^d$ rest upon the corresponding seats 100$^o$ of supporting blocks 100, one lug 110$^d$ of each adjacent apron 110 resting upon the seat 100$^o$ of the same supporting block 100, each apron serving to bridge the gap between a pair of adjacent blocks 100. Located at the upper portion of the inner surface of the wall 110$^a$ is the forwardly projecting, centrally located, locking lug 110$^e$, engageable by the rear end of plow member 150 as indicated in dotted lines in Fig. 18. At each side of the curved wall 110$^a$ is provided a hemi-conical depression 110$^f$ having hemi-cylindrical groove 110$^g$, these depressions and grooves furnishing, when the aprons are in assembled relation, means for seating of the bolts 108 with the heads 108$^a$, see Fig. 4, each bolt serving to partially secure the adjacent apron plates to the subjacent supporting blocks 100. The depressions 108 permit covering bolt heads 108$^a$ with cement, or the like, to protect them from the heat. At one side, the wall 110$^a$ is provided with the extending flange 110$^h$ of less thickness than the wall and fitting in corresponding recesses 110$^i$ in the adjacent apron plate, thus providing an interfitting relation between all of the apron plates. Underlying the curved wall 110$^a$ is also the strengthening rib 110$^k$ shown in Figs. 16, 17 for example, the same terminating above the lower end of the apron plates, which latter are provided with depending tail portions 110$^m$ underlying which are the spaced ribs 110$^n$. When in assembled relation, as shown in Fig. 4, the ribs 110$^n$ contact with channel 107, the tails 110$^m$ of the apron plates 110 terminating adjacent the shoulder 115$^a$ of transverse plate 115, which extends across between the side frame members which are supported on the concrete sub-foundation C, see Fig. 4. It will be understood that in substantial alinement with each of the tuyère bars is a supporting block 100 while the apron plates 110 extend across the entire space between the side frame members. The rear combustion chamber wall 51 is offset at 51$^a$ to form an ash chute 120 in conjunction with the aprons 110. At the bottom of the chute 120 is provided a closure plate 121, pivoted at 122. A fulcrum 123 extends rearwardly from the plate 115 and upon the same is pivoted intermediate its extremities, the lever 124, one end of which is pivotally attached to link 125, the other end of the latter being pivoted at 125$^a$ to the bottom of plate 121. An operating rod 126$^a$ extends forwardly from lever 124 to which it is pivotally connected, being located in a suitable tunnel C$^2$, or the like, in the sub-foundation, a pivoted lever 126$^b$ operatively connecting rod 126$^a$ to a parallel piston rod 126 to transmit reversed piston movement to the plate 121.

Located between the lower extremity of each tuyère bar 102 and the apron plates 110, is provided a casing 130, see Figs. 25 to 29. At its lower front portion is an ear 130$^a$ with bolting aperture 130$^b$, the ear being located between the side plates 100$^a$ of the supporting block 100, and bolted or riveted thereto through apertures 100$^x$, see Fig. 4. Between the sides of the casing 130 is mounted a kicker 135 having trunnions 135$^a$, or the like, journaled in the apertures 130$^c$ in the sides of the casing 130. Each of these kickers is provided with a depending fin 135$^b$, there being a hole to accommodate a pin 135$^c$ therethrough. The front of the kicker 135 is of arcuate form as indicated at 135$^d$ to closely fit an inwardly projecting top flange 130$^e$ of the casing 130. A lug or shoulder 135$^e$ is located at the end of the arcuate portion 135$^d$, its purpose being to contact with flange 130$^e$ to limit the upward movement of the kicker 135. From each kicker extends a link 136 pivoted to the fin 135$^b$ by means of the fin 135$^c$ at one end, and to the crank arm 137 at the other, the crank arms being carried by and rotatable with shaft 138, suitably journaled in brackets 139, secured to and projecting from transverse beam 87. A shaft 138 is provided for each group of kickers so that the latter may be actuated as units, each unit containing any desired number of kickers, it being obvious that the more units there are provided, the more local the treatment which may be applied to the ash and unburned fuel at the rear end of the grate.

It will be obvious in this construction that a kicker is located in alinement with each of the tuyère bars 60$^b$, these kickers serving to disturb or agitate the ash, unburned fuel, clinkers or the like, which may collect at the end of the tuyères and assist its discharge into chute 120.

Each of the shafts 138 projects through the side frame at one side of the stoker and through a passage 139$^a$ in the corresponding side wall 139 of the furnace, terminating in a chamber 140 located beneath the floor level. From the shaft 138 at its extremity is provided a rocker arm 141 to which is pivotally connected one extremity of a connecting bar 142, which in turn is pivoted at 142$^a$ to an operating lever 143, having a socket 143$^a$ in which is seated an operating handle 144. A locking lug 145 is provided apertured for the insertion of a pin 146, which also extends through the lever 143 when the latter is in inoperative position, thus serving to lock the lever in such position. A hollow pedestal 147 surrounds the connecting bars 142 and terminates in a table portion located at a desirable height above the floor. It will be obvious that the manipulation of the handle 144 up and down, will actuate the corresponding unit group of kickers to agitate and discharge the ash above said kickers.

Located intermediate the casings 130 are the ash diverting or plow members 150, see Figs. 19 to 21 for example, these plow members being provided with wedge shaped forwardly projecting portions 150$^a$, having raised ribs 150$^b$ thereon and the reduced or rearwardly extending flanges 150$^c$ having tapered openings 150$^d$ therethrough and shoulders 150$^e$ being formed by portions 150$^a$ and the flanges 150$^c$. In the assembly of the plow members 150, they are attached to the aprons 110 by tilting them sufficiently to permit insertion of the flanges 150$^c$ beneath the top portions 110$^c$ of the aprons, the lugs 110$^x$ fitting in the apertures 150$^d$ and the rear ends of the flanges 150$^c$ resting upon the locking lugs 110$^e$ as shown for example in Fig. 3. The forward portion of each plow 150 rests upon the chain 61, plows and chains being of substantially identical width, the latter preventing disengagement of the plows from the aprons. The upper surfaces of casings 130 are angled or inclined at their rear portions to substantially aline with the upper surfaces of the plow members 150, this construction aiding in the skidding of clinker, ash and the like off the grate surface.

The side frames are provided throughout the greater portion of their length with overhanging, inwardly projecting top portions 175, to which are secured half tuyère supporting blocks 176 by means of machine screws 177, or the like, see Fig. 5. The overhanging portions 175 of the side frames are cut away as indicated in dotted lines at 175$^a$, Fig. 2, for example, and apron blocks 180 are provided resting upon the side frames and having depending rib portions 180$^a$ depending below the upper surface of the side frames and secured to the latter to form a continuation thereof. These apron blocks are provided with the inwardly directed shoulders 180$^b$ which contact with the adjacent plows 150. Rearwardly of the portion 180$^b$ is the recess 180$^c$ into which projects the lug 180$^d$. The adjacent apron plate 110, see Fig. 22, is arranged with the lug 110$^d$ fitting between the lug 180$^d$ and the shoulder 180$^e$ formed at the end of the recess 180$^c$. In this manner the overhanging portions 175 of the side frames and portions 180$^b$ of the blocks 180 contact with the adjacent chains at the sides of the grate and thereby prevent short circuiting of the draught air at the sides of the grate and the seal at the end thereof formed by the apron plates extending continuously from one side to the other of the combustion chamber. The side frame at its rear portion is provided with the flanged bearing seat 185 which supports the end of the idler wheel shaft 66, cross bolt 186 maintaining the shaft in seated position. The side frames are grooved or recessed to permit the dropping of the shaft into the seat 185, a large bearing surface at which is provided by the flanges 185$^a$, as shown in Fig. 23, for example. Depending portion 180$^a$ of the block 180 also fits in the depressed portion of the side frame.

It will be apparent that if air chamber 52 is in communication with the outside atmosphere or with a source of air under pressure, the draught air is substantially prevented from short circuiting past the sides of the stoker and at the rear end thereof, due to the construction above described. At the front end a plate 200 overlies and rests upon the surface of the stoker beneath the fuel hopper 55, plate 200 being reenforced by an additional plate 200$^a$ where the fuel is fed upon it. It will be apparent that the plate 200, when fuel is present in the hopper 55 and resting upon the grate serves to prevent the escape or entrance of draft air at the front of the grate.

It is desirable in some instances to regulate the supply of draught to the rear end of the grate and for that purpose I provide a stationary baffle 201 secured to the I-beam 86 and depending therefrom. This plate 201 rests against one of the rollers 202 which serve to support the return runs of the chains. The plate 201 is provided with cut away portions or port 201$^a$ through which the runs of the chain may pass. Located below the baffle 201 is the shaft 203 extending between the supporting lugs 204 and pivoted therein. Carried by the shaft 203 are the brackets 205 to which is secured a damper plate 206 having a pivoted lower flap 206$^a$. This damper, in the embodiment shown, is slightly bent or angled, so that when in closed position, as indicated in full lines in Fig. 1, the upper portion will rest against the roller 202, and the lower portion with the flap 206$^a$ establishes contact with the subfoundation C. When there is an accumulation of ash, dust or the like, upon the sub-foundation, the flap 206$^a$ will ride thereover and serve to form therewith a seal on closing movement. Carried by the upper portion of the damper 206 is a lug 206$^b$ to which is pivotally attached the link 207, also pivoted at 207$^a$ to a rocker shaft 208. An operating rod 209 is pivoted at one end to the rocker 208 and is provided with a handle 209ª extending outwardly at the front of the furnace for manipulation. By pulling out the rod 209, the damper 206 may be moved to position indicated in dotted lines in Fig. 1, permitting free passage of the draught air to the rear end of the grate. When it is desired to accentuate the draught through the zone of the greater combustion on the grate, the damper may be closed or partially closed thereby substantially restricting the draught to such zone.

The plows 150 and kickers and casings 135, 130 provide an incline to retard and oppose the passage of the ash and thus serve to thicken the bed of ash, unburned fuel, and the like, at the point of discharge, this being a desirable result. Should the accumulating ash reach too great an amount, the kickers 135 may be actuated to assist in its discharge onto plate 121.

In the handling of the ash and products of combustion, it is desirable to quickly discharge the material deposited upon the ash plate 121 and quickly close the same so that the draught in the furnace may not be substantially interfered with, and to that end I have provided an actuating mechanism which will function automatically in cycles covering a desired period of time, the opening and closing of the ash plate being relatively quick, the plate remaining in closed position, during the greater portion of the cycle in order that the discharge may accumulate thereon.

This mechanism I have illustrated in Figs. 30 to 34. It comprises a pair of steam cylinders generally indicated by numerals 225 and 226 and a corresponding pair of hydraulic cylinders 227 and 228, cylinder 227 being in alinement and cooperating with cylinder 225, these two cylinders constituting what I term "pilot" cylinders, cylinder 228 being in alinement with cylinder 226 and constitutitng therewith what I term "service" cylinders.

As will be described below, the cylinders 227 and 228 are connected with an available source of fluid, under pressure, such as water from any available source, cylinders 225 and 226 being connected with a source of steam, for example, steam from the boiler being heated by the furnace. All of the cylinders are united in a common frame, as shown for example in Fig. 31, and a common steam chest 230 is provided, to which steam is led from any suitable source through the pipe 230ª, the steam chest being also provided with an exhaust duct 236. Slidably mounted in steam chest 230 is the slide valve 231 controlling the admission of steam to cylinder 225, an inlet duct 225ª being provided leading to the operating end of cylinder 225 and likewise an exhaust duct 225ᵇ located a slight distance from the adjacent cylinder head. The piston 233 reciprocates in cylinder 225 and is carried by piston rod 234 to the other end of which is attached hydraulic piston 235. At its other end, which I term the non-operative end, cylinder 225 is provided with the constantly open exhaust duct 225ᶜ also located a slight distance from the adjacent cylinder end, leading to a main exhaust port 236. The valve rod 231ª is attached to the slide valve 231 and projects outwardly through suitable stuffing box in the steam chest 230, being provided with a bifurcated head 231ᵇ between which is pivotally attached the rod 238, pivoted at its other end to the depending arm 239ª of rocker shaft 239, journaled in the pedestal bracket 240. At its opposite end rocker shaft 239 carries the actuating arm 239ᵇ actuatable in the manner described below, see Figs. 32 and 33 for example. Carried by the piston rod 234 is the actuating block 234ª operated by which is the actuating arm 241, carried by the rocker shaft 250, journaled in a bearing 251 located beneath bearing 240. At its opposite end rocker shaft 250 carries the arm 250ª opposed with respect to the shaft 250 from arm 241. Cylinder 226 is constructed similarly to cylinder 225 being provided with inlet duct 226ª, duct 226ᵇ and exhaust duct 226ᶜ. A slide valve 260 similar to slide valve 231 is provided in valve chest 230 to control the flow of steam to and from cylinder 226 in a similar manner. Valve rod 260ª extends through the stuffing box and to it is pivotally attached a rod 261, pivotally attached at its other end to arm 250ª. A piston 263 reciprocates in cylinder 226 and carries piston rod 264 which is also secured to hydraulic piston 265 in cylinder 228. An actuating block 264ª carried by the rod 264 contacts with the end of actuating arm 239ᵇ. It will thus be seen from reference to Figs. 32, 33 and 34 that movement of the piston 263, for example, in one direction will move the valve 231 in a similar direction while movement of the piston 233 in one direction will result in movement of valve 260 in the opposite direction.

Cylinders 225 and 226 are open through exhaust ducts 225ᶜ and 226ᶜ at the non-operative ends of the cylinders, while pilot cylinders 225 and 227 are open at their inner ends thus providing also non-operative ends. From piston 263 leads a second piston rod 126 which may be a continuation of piston rod 264 previously described, this being the actuating rod for ash plate 121, the rod 126 being extended, in the embodiment shown, through pier or wall C¹. In Fig. 34 I have indicated by arrows the direction or movement of the pistons in opening and closing the ash plate. In Fig. 30 is shown the arrangement of water supply pipes, the main supply pipe 270 leading from any suitable source of fluid pressure being provided with shut-off valve 270$^a$. From pipe 270 leads a pipe 271 to cylinder 228, a manually adjustable regulating valve 271$^a$ being provided. Also leading from pipe 270 is the pipe 272 having a manually operable valve 272$^a$ and a check valve 273, permitting flow of fluid in the direction indicated by the arrow in Fig. 30. In communication with the pipe 272 and extending around the valves 272$^a$ and 273 is the by-pass 274 having an adjustable restricting valve, such as a needle valve 275, in the line.

The location of the exhaust ducts 225$^b$ 225$^c$ and 226$^b$ and 226$^c$ is such that air or steam will be entrapped as the pistons 233 and 263 approach their limits of travel, thus providing a cushioning means for the pistons.

In the operation of the mechanism just described, assuming the dimensions of the hydraulic and steam pistons to be proper for the relative pressures of steam and water, and piston 263 in the position shown in Fig. 34 at the beginning of the opening stroke, piston 263 will move piston 265 to the left forcing the water or other fluid through pipe 271 back into the supply pipe 270, the pressure of the steam and size of piston 263 being sufficient to overcome the force of the water pressure upon piston 265. During this movement slide valve 231 will be moved to the left as viewed in Fig. 33 admitting steam to the operative end of cylinder 225 and resulting in the movement of piston 233 to the left with piston 235, which will force the water from cylinder 227 through pipe 272, check valve 273 permitting this flow. This movement of piston rod 234 results in movement of the slide valve 260 to the right to cut off the supply of steam to and open exhaust from cylinder 226. After such cut off, the pressure of the water upon piston 265 will move the latter and piston 263 to the right, during which movement slide valve 231 is moved to cut off the supply of steam to and open the exhaust from cylinder 225. After the exhaust from cylinder 225, the water or other actuating fluid must flow through by-pass 274 to cylinder 227, this flow being comparatively slow, so that relatively considerable time will elapse before a sufficient volume of water will enter cylinder 227 to move the piston 235 to the right to return valve 260 to the position which will admit steam to the cylinder 226 to again open the ash plate. Valve 271$^a$ may be adjusted to control the speed of opening and closing of the ash plate by restricting the flow to and from cylinder 228. Valve 272$^a$ can be adjusted to determine the length of the time that the ash plate stays open. Valve 275 may be adjusted to determine the length of time the dump plate stays closed. In this wise comparatively quick opening and closing of the ash plate may be effected in the relatively long cycle during which the plate is maintained in closed position most of the time.

When it is desired to maintain the ash plate in a closed position a valve 230 in the steam line 230$^a$ must be closed and at the same time the cylinder 226 drained through the pet cock X, Fig. 34. When it is desired to maintain the ash plate in open position, valve 271$^a$ must be closed when the dump plate is in the open position and cylinder 228 must be drained through pet cock Y, Fig. 34.

With the stoker mechanism and structure described above, it will be apparent that I obtain the advantage resulting from the use of fixed tuyère bars and moving grate chains, as well as the advantages of a stationary grate in which the leakage of draught air is impossible. By my construction the draught is obtained through the tuyère bars and the grate chains to and through the body of fuel and as described above, short circuiting at the side or ends of the grate is substantially precluded by means of the structure described. At the same time provision is made for the removal of ash and unburned fuel from the grate and its deposit in the ash chute.

The provision of the stationary tuyère bars permit insertion of the supporting blocks at the rear end of the stoker, thus providing a plurality of rigid anchored supports for the sealing aprons and tying the rear end sealing means to the stoker mechanism which insures proper correlation despite contraction and expansion of the stoker.

The checkered recesses upon the sealing plates 110 serve to collect the ash or the like, which acts as a heat and wear resistant. The plow members and aprons, as well as the kickers and casings, may be readily removed and replaced with a minimum of inconvenience and expense.

The construction and operation of my invention is believed to be sufficiently clear from the above description to enable those skilled in the art to understand the same.

It will be obvious that my invention is susceptible to modification and I do not wish to be restricted to the form shown and described, except as defined in the appended claims.

What I claim is—

1. In combination, a stoker mechanism comprising alternately arranged moving grate chains and stationary tuyère bars, draught sealing means at the rear end of said stoker, said means comprising sealing members extending across the rear end of said stoker and overlying the same, and means extending forwardly of said sealing members in alinement with said tuyère bars to retard the passage of ash and the like.

2. In combination, a grate comprising spaced endless grate chains, supporting and moving means therefor, spaced transverse beams at the rear portion of said grate, block members extending between and secured to said beams in the spaces between said chains, and sealing aprons carried by said block members at the rear end of said grate.

3. In combination, a stoker mechanism comprising alternately arranged moving grate chains, and stationary tuyère bars, draught sealing means at the rear end of said stoker, said means comprising sealing members extending across the rear end of said stoker and overlying the same, and means extending forwardly of said sealing members in alinement with said tuyère bars to retard the passage of ash and the like, said last named means being provided with movable members to assist in the removal of accumulated ash.

4. In combination, a stoker mechanism comprising alternately arranged moving grate chains and stationary tuyère bars, draught sealing means at the rear end of said stoker, said means comprising sealing members extending across the rear end of said stoker and overlying the same, and means extending forwardly of said sealing members in alinement with said tuyère bars to retard the passage of ash and the like, said last named means being provided with movable members to assist in the removal of accumulated ash, and means to actuate said movable members.

5. In combination with a stoker comprising endless chains, a sealing apron overlying one end of said stoker and having a shoulder and a boss located forwardly thereof, an ash diverting member having an apertured flange, said flange being seatable upon said shoulder of said apron, said boss fitting into said aperture.

6. In combination with a stoker comprising endless chains, a sealing apron overlying one end of said stoker and having a shoulder and a boss located forwardly thereof, an ash diverting member having an apertured flange, said flange being seatable upon said shoulder of said apron, said boss fitting into said aperture, said ash diverting member having a wedge-shaped body portion, and a shoulder at the juncture of said flange and body portion.

7. In mechanism of the class described, a sealing apron having a shoulder and a boss located forwardly thereof, a plow having an apertured flange, said flange being seatable upon said shoulder of said apron, said boss fitting into said aperture, said plow having a wedge-shaped body portion, said body portion being provided with grooves increasing in depth from rear to front.

8. In combination, a stoker comprising endless moving spaced grate chains, supporting blocks located between said chains, and sealing members extending between and supported by said blocks.

9. In combination, a stoker comprising endless moving spaced grate chains, supporting blocks located between said chains, sealing members extending between and supported by said blocks, and ash diverting members attached to and projecting forwardly of said sealing members, said ash diverting members resting upon said chains.

10. In combination, a stoker comprising endless moving spaced grate chains, supporting blocks located between said chains, sealing members extending between and supported by said blocks, and ash diverting members attached to and projecting forwardly of said sealing members, said ash diverting members resting upon said chains, and having their upper surface located at an angle to the plane of the surface of said chain.

11. In mechanism of the class described, a stoker comprising spaced endless moving grate chains, stationary bars located between said chains, supporting blocks located between said chains adjacent the ends of said bars, sealing aprons extending between and carried by said supporting blocks, plows extending forwardly of said aprons and coacting with said chain grates to remove the ash therefrom, and ash retarding means extending forwardly of said members between said chains and in line with said bars.

12. In mechanism of the class described, a stoker comprising spaced endless moving grate chains, stationary bars located between said chains, supporting blocks located between said chains adjacent the end of said bars, sealing aprons extending between and carried by said supporting blocks, plows extending forwardly of said aprons and coacting with said chain grates to remove the ash therefrom, and ash retarding means extending forwardly of said members between said chains and in line with said bars, said retarding means being provided with means to assist in the removal and discharge of ash.

13. In combination with a supporting foundation, a stoker comprising endless moving grate chains and means to regulate the draft adjacent the rear end of said stoker, said means comprising fixed baffling means extending downwardly from the upper run of said chains, and a coacting pivoted damper extending downwardly from the lower run of said chains to said foundation.

14. In combination with a furnace having a combustion chamber and a draught chamber, a stoker comprising endless moving grate chains, a stationary baffle extending from the upper runs of said chains, and a pivotally mounted damper coacting with said baffle to regulate the flow of draught air to one portion of said stoker, said pivotally mounted damper being provided with a pivoted flap located adjacent the bottom of said draught chamber.

15. In combination with a furnace having a combustion chamber and a draught chamber, a stoker comprising endless moving grate chains, a stationary baffling means extending from the upper runs of said chains, said baffling means being provided with apertures to accommodate the lower runs of said stoker, and a pivoted damper coacting with said baffling means to regulate the draft through one portion of said stoker.

16. In combination with a furnace having a combustion chamber and a draught chamber, a stoker comprising endless moving grate chains, a stationary baffle extending from the upper runs of said chains, a pivotally mounted damper coacting with said baffle to regulate the flow of draught air to one portion of said stoker chains, said pivotally mounted damper being provided with a pivoted flap located adjacent the bottom of said draught damper, and means to operate said damper from outside said furnace.

17. In combination, a stoker comprising alternating endless moving grate chains and stationary bars, movable members located adjacent the ends of said bars, said members being pivotally mounted, means to actuate said members comprising a rotatable shaft, and means to operatively attach said shaft to said members.

18. In combination, a stoker comprising alternating endless moving grate chains and stationary bars, casings located adjacent the ends of said bars extending between said chains, and ash disturbing members pivotally mounted in said casings.

19. In combination, a stoker comprising alternating endless moving grate chains and stationary bars, casings located adjacent the rear ends of said bars extending between said chains and ash disturbing members pivotally mounted in said casings, said casings being provided with inclined upper surfaces to normally retard the movement of ash thereover from said bars.

20. In combination, a stoker comprising alternating endless moving grate chains and stationary bars, supporting blocks located between said chains at the rear end of said structure, casings mounted upon and supported by said blocks forming a continuation of said bars, and movable members carried by said casings.

21. In combination, a stoker comprising alternating endless moving grate chains and stationary bars, supporting blocks located between said chains at the rear end of such structure, casings mounted upon and supported by said blocks forming a continuation of said bars, and movable members carried by said casings said blocks being provided with spaced plates supporting and located beneath the sides of said casings.

22. In combination, a stoker comprising alternating endless moving grate chains and stationary bars, supporting blocks located between said chains at the rear end of such structure, casings mounted upon and supported by said blocks forming a continuation of said bars, movable members carried by said casings, said blocks being provided with spaced plates supporting and located beneath the sides of said casings, and a lever arm extending between the plates of each casing and operatively attached to the corresponding ash disturbing member carried thereby.

23. In combination, a stoker comprising alternating endless grate chains and intermediate tuyère bars, transverse supporting means at the rear end of said stoker, members extending between said chains at the rear ends of said bars and provided with movable means to agitate or disturb ash passing thereover, and ash diverting members alternating with said extending members above said chains.

24. In combination, a stoker comprising alternating endless grate chains and intermediate tuyère bars, transverse supporting means at the rear end of said stoker, members extending between said chains at the rear ends of said bars and provided with movable means to agitate or disturb ash passing thereover, ash diverting members alternating with said extending members above said chains, and sealing aprons overlying the rear end of said stoker and extending rearwardly from said extending members and ash diverting members.

25. In combination, a stoker comprising alternating endless grate chains and intermediate tuyère bars, transverse supporting means at the rear end of said stoker, members extending between said chains at the rear ends of said bars and provided with movable means to agitate or disturb ash passing thereover, ash diverting members alternating with said extending members above said chains, and sealing aprons overlying the rear end of said stoker and extending rearwardly from said extending members and ash diverting members, supporting blocks on said transverse supporting means, and supporting said extending members and aprons.

26. In combination, a stoker comprising alternating endless grate chains and intermediate tuyère bars, transverse supporting means at the rear end of said stoker, members extending between said chains at the rear ends of said bars and provided with movable means to agitate or disturb ash passing thereover, ash diverting members alternating with said extending members above said chains, and sealing aprons overlying the rear end of said stoker and extending rearwardly from said extending members and ash diverting members, supporting blocks on said transverse supporting means, and supporting said extending members and aprons, said ash diverting means being supported by said aprons.

In testimony whereof, I have subscribed my name.

LOYD R. STOWE.